Sept. 17, 1968     T. R. DEMYON     3,401,958
NIPPLE SEAL
Filed Feb. 19, 1965     2 Sheets-Sheet 1
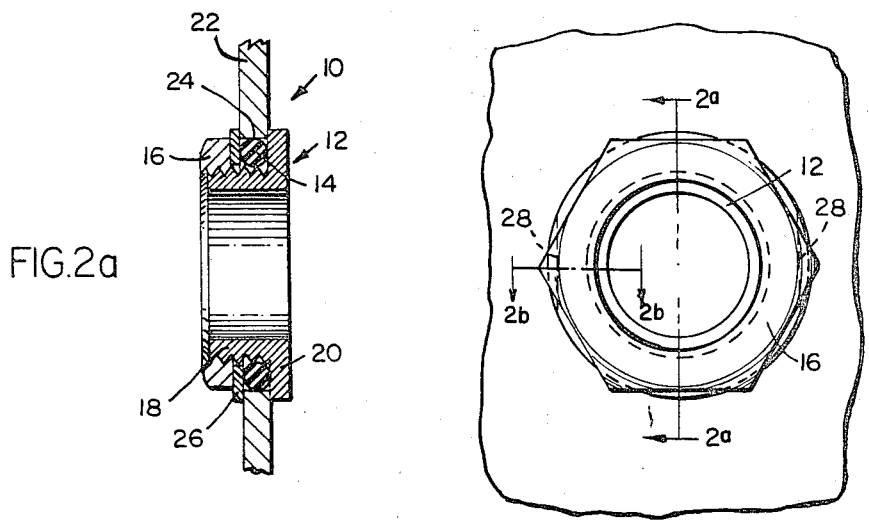
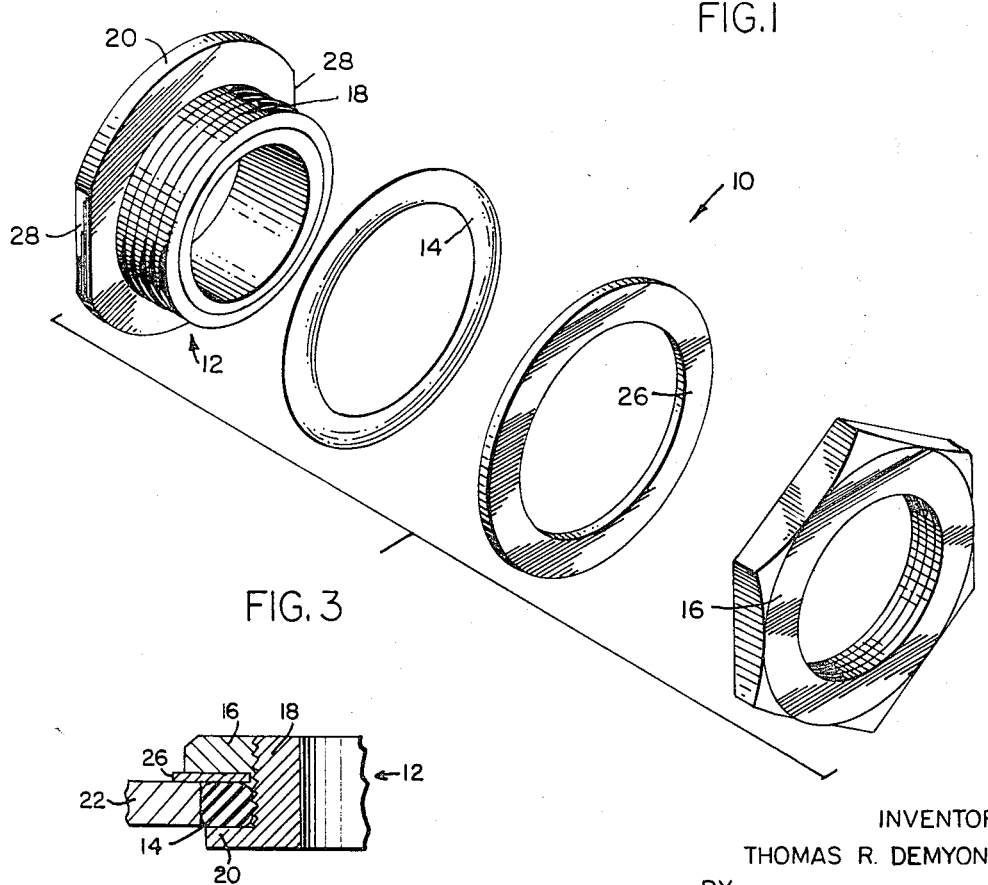
INVENTOR
THOMAS R. DEMYON
BY,
ATTORNEY

INVENTOR
THOMAS R. DEMYON
BY,
ATTORNEY

United States Patent Office 3,401,958
Patented Sept. 17, 1968

3,401,958
NIPPLE SEAL
Thomas R. Demyon, 1640 Gorsuch Ave.,
Baltimore, Md. 21218
Filed Feb. 19, 1965, Ser. No. 433,882
3 Claims. (Cl. 285—208)

ABSTRACT OF THE DISCLOSURE

The nipple seal includes an O-ring bearing on and compressed between opposing surfaces about the nipple in both an axial and a radial direction. This balanced orthogonal compression both completely contains the O-ring to prevent it from flowing with age and releasing the seal, and it allows opposed surfaces of the nipple to mechanically lock the nipple to an adjacent wall structure. The nipple is shaped to permit it and the seal to be installed while working from only one side of a wall.

---

This invention relates to sealing, and more particularly to sealing a nipple around an opening in a wall.

There are a number of ways to seal a nipple around an opening in a wall. Generally they may be classified as either non-resilient seals, such as welds and solder, or resilient seals, such as rubber or cork rings. A non-resilient seal attaches the nipple in a permanent fashion, and detaching such a sealed nipple from the wall usually requires so marring the nipple that its usefulness is destroyed. Resilient seals may be used to avoid this result. Yet, because of their yielding nature, all known resilient seals inherently tend to creep or give with age and heat. This action gradually releases the seal between the nipple and the wall. Because of this, all known resilient seals will leak after a while. This means that with presently available seals, the nipple may be attached in a permanent fashion around the opening in the wall using a non-resilient seal which will not leak, or removably attached using a resilient seal which will tend to leak after a time. Obviously what is needed is a way to removably attach the nipple around the opening in the wall using a resilient seal which will not tend to leak with age. Achieving this is one object of the present invention.

There is another major problem confronted when considering removably attaching a nipple around an opening in a wall. Most often it is quite difficult to get at both sides of the wall; at times it is even impossible. Yet most removably attached nipple assemblies require simultaneous access to both sides of the wall for installation. There are some nipple assemblies which may be installed from one side of the wall. Usually they are identified by a profusion of parts and elaborate provisions for sealing. They are expensive, and to install them is an involved, tedious and time-consuming affair. There seems to be no inherent reason why such an elaborate assembly is required. Even nipple assemblies which may be installed from one side of a wall should consist of only a few parts, and should be capable of quick and easy installation. To provide such a nipple assembly is another object of the present invention.

In summary then, the present invention has two main objects: to removably attach a nipple around an opening in a wall using a resilient seal which will not leak with age; and to install the nipple assembly from one side of the wall only with a minimum of parts. Other objects of the invention will be apparent from the following description.

It should be understood that the opening in the wall could be of any shape, and the shape of the various members of the nipple assembly would then be correlated with the shape of the opening. However, since circular openings are the most common and easily made, the various members of the nipple assembly will be described herein as shaped to be attached around a circular opening. Nevertheless, any person reasonably skilled in this art and familiar with the principles of the present invention could readily modify the shape of the various members of the nipple assembly to fit any shape opening, and the invention encompasses such modifications.

The preferred embodiment of the present invention relates to a nipple assembly removably attached about an opening in a wall. The nipple assembly includes basically three members: a nipple having a cylindrical nipple body and an annular flange at one end extending outwardly beyond the surface of the cylindrical body; means such as a nut for positioning and securing the nipple body in the opening with the flange bearing against the surface of the wall adjacent to the opening and for forming a confined annular space with the nipple body, the flange, and the wall edge defining the opening; and a resilient sealing ring compressed into the confined annular space for sealing the exterior surface of the nipple body to the side edges of the wall defining the opening, and thereby sealing the nipple to the wall. Because the sealing ring is confined in the annular space formed between the nipple body, the flange, and the wall edge defining the opening, the sealing ring will not tend to give and creep either inwardly or outwardly with age or use to relieve the seal joining the nipple to the wall. In other words, because of the construction of the nipple assembly and the correlation of the elements of the nipple assembly with the size of the opening in the wall, the nipple assembly is removably attached to the wall and yet the joint between the nipple assembly and the wall is sealed in a manner which will not leak even over a considerable period of time.

To enable the nipple assembly to be installed from one side of the wall, the flange of the nipple includes an edge portion shaped to provide a minimum diameter across the flange less than the diameter of the opening in the wall. However, the major diameter of the flange is greater than the diameter of the opening. This arrangement permits the flange of the nipple to be passed through the opening by hooking the nipple through the opening with the edge portion of reduced diameter adjacent to the side of the opening. Once the flange is through the opening, the body of the nipple is turned perpendicular to the wall and pulled forward so that the inner face of the flange abuts the side of the wall adjacent to the opening. The sealing ring is then passed down about the body of the nipple to lie on the flange between the rim of the opening and the side of the nipple body. Assuming a nut is used to compress the sealing ring, as is preferred, it is screwed down about the nipple body to bear against the wall and clamp the wall between it and the flange, securing the nipple assembly around the opening in the wall and compressing and containing the sealing ring in the confined annular space between the nipple and the wall.

The present invention will now be further described in connection with the accompanying drawings in which:

FIGURE 1 is a front view of the nipple assembly mounted in an opening in a wall;

FIGURES 2a and 2b are sectional views taken on lines 2a—2a and 2b—2b, respectively, of FIGURE 1;

FIGURE 3 is an exploded view of the nipple assembly;

Figure 4:
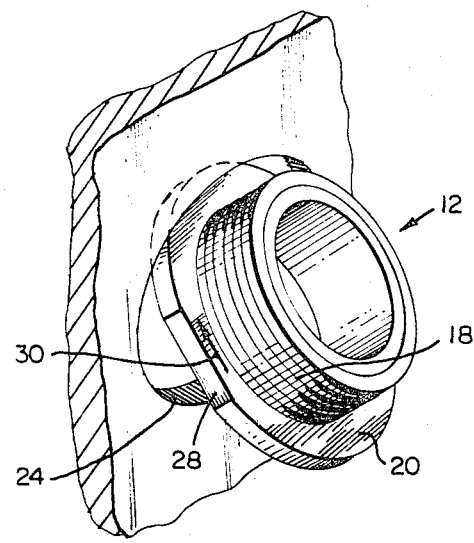
FIGURE 4 is a perspective view showing the flange of the nipple body being passed through an opening in a wall.

The main elements of the preferred construction of a nipple assembly 10 include a nipple 12, a resilient sealing ring 14 and a nut 16. The nipple itself consists of a hollow cylindrical body 18 and an annular flange 20 larger than the body and fixed to the body at one end thereof, preferably by being formed as an extension of the body. Complementary threads are cut on the exterior surface of the nipple body and the interior surface of the nut so that the nut may be screwed down around the body of the nipple.

To install the nipple assembly around an opening in a wall 22 defined by edge 24, the components of the nipple assembly are separated and the nipple positioned in the opening so that the face of the annular flange 20 abuts the face of the wall adjacent to the opening, as shown most clearly in FIGURE 2b. The sealing ring 14 is placed over the nipple body and against the face of the flange, and lies between the nipple body and the edge of the wall defining the opening. Then the nut 16 is threaded down around the nipple body until its inner face bears against the face of the wall and the sealing ring.

The last few turns of the nut 16 compress sealing ring 14, causing it to deform into and for the most part fill the annular space defined by the edges 24 of the wall, the inner face of the flange 20, the surface of the nipple body 18, and the inner face of the nut 16, as shown most clearly in FIGURE 2b. In this manner, the sealing ring seals the surfaces to one another. Because the last few turns of the nut, as it bears against and compresses the sealing ring, may tend to severely abrade and shred some sealing rings, a thin washer 26 may be provided between the nut and the ring if desired to prevent abrasion by the nut.

The thickness of the sealing ring is important. The sealing ring is thicker than the wall, so that when the nut bears against the wall, its inner face bears against and compresses the sealing ring against the opposed face of the flange. This forces the innermost surface of the ring to bulge and press firmly against the exterior surface of the nipple body and the outermost surface of the ring to bulge and press firmly against the edge of the wall defining the opening. Accordingly, when the nipple assembly is secured around an opening in a wall, the sealing ring is confined in a completely enclosed annular space whose walls are the edge 24, the face of the flange 20, the surface of the nipple body 18, and the face of the nut 16 as shown in FIGURE 2b. Because of this complete confinement, the orthogonally opposed forces on the sealing ring are counterbalanced by one another, and the sealing ring will not tend to yield or creep in any direction even over an extended period of time. Since it is preferred to use a sealing ring which is substantially circular in cross-section, as shown, to obtain the aforementioned results, the distance between the nipple body and the edge of the opening should be greater than the thickness of the wall. Because the sealing ring bears against four orthogonally opposed surfaces—namely, the inner face of the nut, the edge 24 defining the opening through the wall, the inner face of the flange, and the exterior surface of the nipple body—not only is the nipple sealed to the wall, but the nipple, its flange, the wall and the nut are all sealed to one another. This multiplicity of individual seals multiplies the effectiveness of the overall seal obtained by the nipple assembly of the present invention.

By virtue of the correlation of the elements of the nipple assembly with the size and shape of the opening in the wall, and the thickness of the wall, the sealing ring will always seal the nipple assembly to the wall and has no tendency to yield in any direction and permit the assembly to leak. Furthermore, since the nut and flange bear directly against opposite sides of the wall, and neither is separated from the wall by a sealing ring, the depth of the annular space containing the sealing ring is positively and mechanically fixed by the thickness of the wall, and the nipple assembly is rigidly held relative to the wall by the nut and the flange. Accordingly, any tendency of the nipple assembly to rock relative to the wall and mechanically stress or flex the sealing ring is minimized. In this manner the preferred nipple assembly of the present invention is removably attached around an opening in a wall and sealed to the wall by a resilient seal which has no appreciable tendency to creep or give and release the seal, since it is completely confined and contained on all four sides.

To permit the nipple assembly to be assembled and attached around an opening in a wall from one side of the wall only, opposed edge portions 28 of the flange 20 are flattened sufficiently to reduce the minimum dimension between these surfaces to a distance less than the diameter of the opening in the wall defined by edge 24. Thus by holding the nipple body 18 and positioning these opposed flattened edge surfaces of the flange adjacent to the edge of the wall defining the opening, and then passing the flange through the opening with a rocking motion generally as indicated by arrow 30 in FIGURE 4 while maintaining these edge portions adjacent to the opening, the flange 20 of the nipple body may be passed through the opening from one face of the wall to place it against the other face of the wall. After the flange has been rocked through the opening and brought to bear against the face of the wall, there will be a small space between the edge surfaces 28 of the flange 20 and the edge 24 of the wall which defines the opening. Yet these spaces are so small compared to the sealing ring that the sealing ring will not bend to yield and creep out through them as it ages. In fact, normally the sealing ring will not be so compressed by the nut that it will even bulge into these spaces.

By virtue of this construction, a minimum of parts are utilized to provide a nipple assembly which may be removably secured around an opening in a wall with access from one face of the wall only, and yet one which is so effectively sealed by a resilient seal that the seal will not tend to give and leak as it ages.

Figure 5:
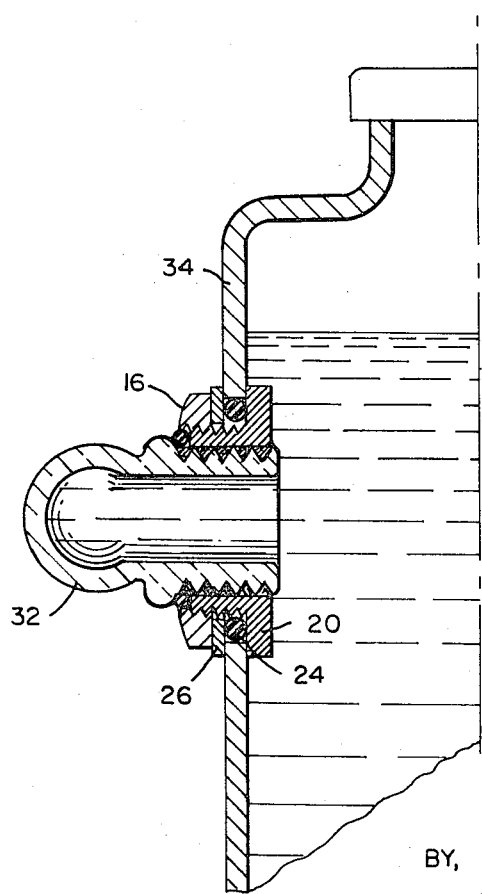
FIGURE 5 is a vertical sectional view of an engine radiator showing the nipple assembly mounted in a wall of the radiator and receiving a sight glass of a radiator sight gauge.

In practice, the nipple assembly of the present invention has proven of great use in mounting the sight glass 32 of a radiator sight gauge to an automobile radiator 34 as shown in Figure 5. In such an environment, it is exceedingly difficult, if not impossible, to get into the radiator. As a practical matter, there is access only to the outer surface of the radiator wall. Using the nipple assembly of the present invention this limitation presents no problem. To attach the sight glass to the radiator, an opening is first cut through the radiator wall, and then the nipple assembly is attached around the opening in a manner previously described, after which the radiator sight gauge is mounted to the nipple as by threading it into the interior of the nipple body on complementary threads which may be provided herein.

Since various modifications of the nipple assembly will be apparent to those skilled in this art, the scope of the invention is not to be limited to the specific arrangement of parts described herein. Rather, the invention is defined in the following claims.

I claim:

1. A nipple assembly capable of being removably attached about a generally circular opening in a wall from one side of a wall, the sides of the wall being defined by two substantially parallel planes, the nipple assembly including a nipple having a generally cylindrical, rigid body and a rigid circumferentially continuous annular flange projecting outwardly from the body, the flange including first opposed edge portions of a diameter slightly less than the diameter of the opening in the wall and second opposed edge portions of a diameter greater than the diameter of the opening in the wall whereby the flange may be passed through the opening in the wall from one side of the wall by positioning the first opposed edge portions adjacent to opposed edge portions defining the opening in the wall, means for removably securing the nipple body in the opening with the portions of the flange larger in diameter than the opening bearing against the surface of the wall adjacent to the opening and defining an annular space between the nipple body and the wall, the distance between the cylindrical body and the wall edge being greater than the thickness of the wall, resilient O-ring sealing means in the annular space, the sealing means in cross-section being substantially circular and of a diameter greater than the thickness of the wall, and means for diametrically compressing the sealing means directly against a continuous annular area about the flange to cause it to bulge and press against both the wall edge defining the opening and the surface of the nipple body and thereby to seal against the flange, wall edge, compressing means and nipple body under orthogonally balanced compressive forces, the diametrical distance between the first opposed edge portions of the flange being greater than the diameter of the continuous annular area about the flange which bears against the O-ring sealing means, and said O-ring sealing means when in said compressed sealing condition always remaining within the boundaries defined by said planes.

2. A nipple assembly as set forth in claim 1 in which the means for removably securing the nipple body in the opening comprises a nut threadably engaging the outer surface of the body, the face of the nut nearest the wall comprising the means for compressing the sealing means against the flange.

3. A nipple assembly as set forth in claim 2 including a washer about the nipple body and between the nut and the wall.

References Cited
UNITED STATES PATENTS

| | | | |
|---|---|---|---|
| 2,459,609 | 1/1949 | Wolfram | 285—348 X |
| 643,237 | 2/1900 | Row | 285—206 |
| 2,277,885 | 3/1942 | Rodanet | 285—206 X |
| 2,723,048 | 11/1958 | Welch | 85—1 |
| 2,874,749 | 2/1959 | Brink | 285—206 X |
| 2,936,787 | 5/1960 | Mercier | 285—208 X |
| 1,978,958 | 10/1934 | Robinson. | |

FOREIGN PATENTS 236,167   10/1961   Australia.

CARL W. TOMLIN, *Primary Examiner.*

D. W. AROLA, *Assistant Examiner.*